(12) United States Patent
Shimizu et al.

(10) Patent No.: US 10,982,767 B2
(45) Date of Patent: Apr. 20, 2021

(54) PISTON RING

(71) Applicant: KABUSHIKI KAISHA RIKEN, Tokyo (JP)

(72) Inventors: Hiroshi Shimizu, Kashiwazaki (JP); Takayuki Yoguchi, Kashiwazaki (JP); Takayuki Kondo, Kashiwazaki (JP); Masaaki Fujita, Kashiwazaki (JP)

(*) Notice: Subject to any disclaimer, the term of this patent is extended or adjusted under 35 U.S.C. 154(b) by 0 days.

(21) Appl. No.: 16/495,106

(22) PCT Filed: Jan. 10, 2018

(86) PCT No.: PCT/JP2018/000345
§ 371 (c)(1),
(2) Date: Sep. 18, 2019

(87) PCT Pub. No.: WO2018/173423
PCT Pub. Date: Sep. 27, 2018

(65) Prior Publication Data
US 2020/0018395 A1   Jan. 16, 2020

(30) Foreign Application Priority Data
Mar. 23, 2017   (JP) .............................. JP2017-057751

(51) Int. Cl.
*F16J 9/14*   (2006.01)
(52) U.S. Cl.
CPC ....................................... *F16J 9/14* (2013.01)
(58) Field of Classification Search
CPC ..................................... F16J 15/14; F16J 9/14
See application file for complete search history.

(56) References Cited

U.S. PATENT DOCUMENTS

| | | | | |
|---|---|---|---|---|
| 1,613,410 A | * | 1/1927 | Post | F16J 9/206 277/460 |
| 4,189,161 A | * | 2/1980 | Grimm | F16J 9/14 277/496 |
| 5,253,878 A | * | 10/1993 | Miura | F16J 9/14 277/499 |

(Continued)

FOREIGN PATENT DOCUMENTS

| CN | 101482070 | 7/2009 |
|---|---|---|
| CN | 202510241 | 10/2012 |

(Continued)

OTHER PUBLICATIONS

Extended Search Report in corresponding European Application No. 18771357.3 dated Dec. 1, 2020.

*Primary Examiner* — Vishal A Patel
(74) *Attorney, Agent, or Firm* — SOEI Patent & Law Firm

(57) ABSTRACT

A piston ring which is resinous includes an annular main body portion having an inner peripheral surface and an outer peripheral surface facing each other and a pair of side surfaces interconnecting the inner peripheral surface and the outer peripheral surface and a joint portion 3 formed in the main body portion. The joint portion has a step shape when viewed from at least one of the pair of side surfaces and the outer peripheral surface. The outer peripheral surface has a tapered surface having an outer diameter increasing from a side of one side surface of the pair of side surfaces of the main body portion toward a side of the other side surface.

2 Claims, 16 Drawing Sheets

(56) References Cited

U.S. PATENT DOCUMENTS

| | | | | |
|---|---|---|---|---|
| 5,618,046 | A | * | 4/1997 | Binford .................... F16J 9/062 |
| | | | | 277/464 |
| 5,660,398 | A | * | 8/1997 | Terao .................... F16J 15/3272 |
| | | | | 277/581 |
| 5,779,243 | A | | 7/1998 | Hanlon |
| 5,882,012 | A | * | 3/1999 | Niwa ........................ F16J 9/14 |
| | | | | 277/407 |
| 5,934,680 | A | * | 8/1999 | Kakehi .................. B63H 23/32 |
| | | | | 277/499 |
| 6,267,380 | B1 | * | 7/2001 | Feistel .................... F16J 15/26 |
| | | | | 277/309 |
| 6,997,460 | B2 | * | 2/2006 | Brunke .................... F16J 9/20 |
| | | | | 277/460 |
| 7,341,256 | B2 | * | 3/2008 | Nakaoka ................ F16J 15/441 |
| | | | | 277/496 |
| 2013/0305918 | A1 | | 11/2013 | Okazaki et al. |

FOREIGN PATENT DOCUMENTS

| | | |
|---|---|---|
| CN | 104863745 | 8/2015 |
| DE | 102014011532 | 2/2016 |
| EP | 1277995 | 1/2003 |
| EP | 3112727 | 1/2017 |
| JP | 2002-323133 | 11/2002 |
| JP | 2003-328852 | 11/2003 |
| JP | 3848394 | 11/2006 |
| JP | 4165119 | 10/2008 |
| JP | 2010-236649 | 10/2010 |
| JP | 2012-163118 | 8/2012 |
| JP | 2015-503072 | 1/2015 |
| JP | 5658585 | 1/2015 |
| WO | 2013/090436 | 6/2013 |

\* cited by examiner (A)

(B)

(A)

(B)

(A)

(B)

(A)

(B)

(A)

(B)

PISTON RING

CROSS-REFERENCE TO RELATED APPLICATIONS

This application is a 35 U.S.C. § 371 national phase application of PCT/JP2018/000345, filed on Jan. 10, 2018, which claims priority to Japanese Patent Application No. 2017-057751, filed on Mar. 23, 2017.

TECHNICAL FIELD

The present invention relates to a piston ring used in an internal combustion engine.

BACKGROUND

A piston ring used in an internal combustion engine of an automobile or the like has the function of preventing blow-by gas from a combustion chamber side to a crank chamber side by, for example, the piston ring being provided in a ring groove in a piston outer peripheral surface, the outer peripheral surface of the piston ring being in sliding contact with a bore inner peripheral surface, and a side surface side of the piston ring abutting against a side surface of the ring groove to form a seal surface. Such a piston ring has a split ring shape having a joint portion, and thus blow-by gas suppression in the joint portion is required. Suppressing blow-by gas by giving a joint shape a special structure as in Patent Literature 1 has been studied in this regard.

CITATION LIST

Patent Literature

Patent Literature 1: Japanese Unexamined Patent Publication No. 2012-163118

SUMMARY OF INVENTION

Technical Problem

However, the piston ring described in Patent Literature 1 does not focus on oil consumption amount reduction. Accordingly, there is room for improvement regarding oil consumption amount reduction.

The present invention has been made in view of the above, and an object of the present invention is to provide a piston ring capable of achieving both blow-by gas suppression and oil consumption amount reduction.

Solution to Problem

In order to achieve the above object, a piston ring according to an aspect of the present invention may be resinous and include an annular main body portion having an inner peripheral surface and an outer peripheral surface facing each other and a pair of side surfaces interconnecting the inner peripheral surface and the outer peripheral surface and a joint portion formed in the main body portion. The joint portion may have a step shape when viewed from at least one of the pair of side surfaces and the outer peripheral surface. The outer peripheral surface may have a tapered surface having an outer diameter increasing from a side of one side surface of the pair of side surfaces toward a side of the other side surface.

Since the piston ring is made of resin, the piston ring is smaller in specific gravity than existing metallic piston rings. Accordingly, the ring is unlikely to be lifted and the piston ring is capable of enhancing side surface sealability. The joint portion of the piston ring has a step shape when viewed from at least one of the pair of side surfaces and the outer peripheral surface. Accordingly, after attachment to a piston, the flow area formed between the pair of side surfaces is reduced and a reduction in gas amount is achieved. Accordingly, gas sealability improvement and blow-by gas suppression can be achieved. The outer peripheral surface of the piston ring has the tapered surface, and thus the oil scraping effect of the outer peripheral surface of the piston ring is enhanced and the amount of oil consumption can be reduced.

Possible here is an aspect in which the tapered surface is provided at a part of the outer peripheral surface on the one side surface side and an end portion of a step-shaped step portion on the outer peripheral surface side is provided at a position different from the tapered surface, the step portion being formed continuously from the outer peripheral surface. By the end portion of the step-shaped step portion on the outer peripheral surface side being provided at a position different from the tapered surface with the step portion formed continuously from the outer peripheral surface, a movement of blow-by gas in the vicinity of the end portion on the outer peripheral surface side is suppressed. Accordingly, the blow-by gas suppression effect is enhanced.

Also possible is an aspect in which the tapered surface is provided at a part of the outer peripheral surface on the one side surface side and a reverse tapered surface is provided at a part of the outer peripheral surface on the other side surface side and the reverse tapered surface has an outer diameter increasing from the other side surface side toward the one side surface side. By a configuration that has the reverse tapered surface being adopted as described above, the oil scraping effect of the outer peripheral surface of the piston ring is enhanced and the effect of oil consumption amount reduction is further enhanced.

Also possible is an aspect in which a flat surface is provided between the tapered surface and the reverse tapered surface on the outer peripheral surface and an end portion of a step-shaped step portion on the outer peripheral surface side is provided on the flat surface, the step portion being formed continuously from the outer peripheral surface. By a configuration in which the end portion of the step-shaped step portion is provided on the flat surface being adopted as described above, it is possible to prevent a gas flow path from being provided between the pair of side surfaces outside the end portion of the step-shaped step portion and blow-by gas can be further suppressed.

Also possible is an aspect in which a corner portion formed by the other side surface and the outer peripheral surface has a notch portion. By the notch portion being provided, the oil scraping effect of the outer peripheral surface of the piston ring is enhanced and the effect of oil consumption amount reduction is further enhanced.

Also possible is an aspect in which the notch portion is provided at a position different from the joint portion. By means of the structure in which the notch portion is provided at a position different from the joint portion, it is possible to realize a reduction in oil consumption amount while maintaining the strength of the vicinity of the joint portion.

Also possible is an aspect in which the notch portion is intermittently provided along the main body portion. By the notch portion being provided with intermittence, a configuration in which the ratio of the notch portion to the entire circumference of the main body portion can be controlled is achieved. In this case, it is possible to control the side surface sealability of the piston ring within an appropriate range.

Also possible is an aspect in which the other side surface has a convex curved surface. By the other side surface having the convex curved surface, it is possible to reduce side surface sealability on the other side surface and enhance the effect of oil consumption amount reduction.

Also possible is an aspect in which the other side surface has a recessed portion. By the other side surface having the recessed portion, it is possible to reduce side surface sealability on the other side surface and enhance the effect of oil consumption amount reduction.

Also possible is an aspect in which a surface treatment film is provided on at least one of the inner peripheral surface, the outer peripheral surface, the one side surface, the other side surface, and a jointing surface of the joint portion. After the surface treatment film is provided, wear resistance is improved by the surface treatment film.

Advantageous Effects of Invention

According to the present invention, a piston ring capable of achieving both blow-by gas suppression and oil consumption amount reduction is provided.

DETAILED DESCRIPTION

Figure 1:
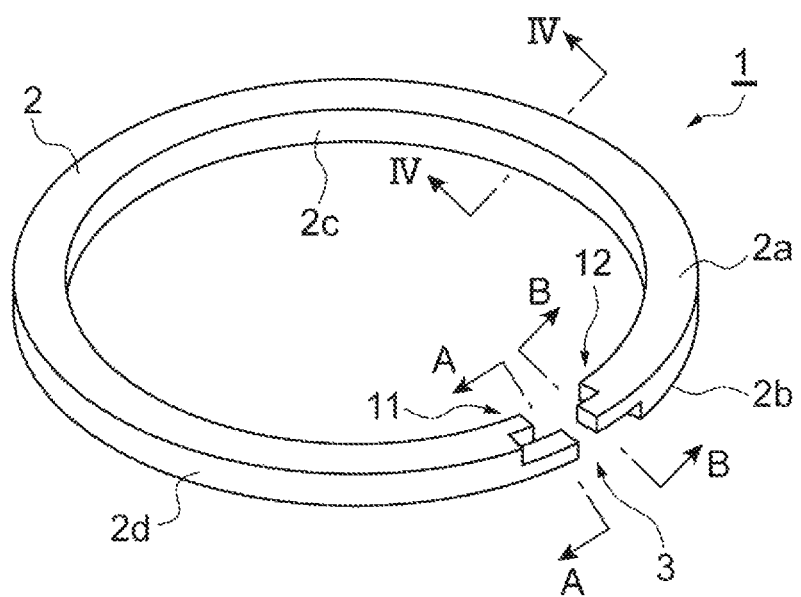
FIG. 1 is a perspective view illustrating a piston ring according to an embodiment of the present invention.

Hereinafter, an embodiment for carrying out the present invention will be described in detail with reference to the accompanying drawings. In the description of the drawings, the same elements are denoted by the same reference numerals with redundant description omitted.

FIG. 1 is a perspective view illustrating a piston ring according to an embodiment of the present invention. A piston ring 1 illustrated in FIG. 1 is provided in a ring groove in a piston outer peripheral surface in an internal combustion engine of an automobile or the like. The piston ring 1 has the function of preventing blow-by gas from a combustion chamber side to a crank chamber side by an outer peripheral surface 2d being in sliding contact with a bore inner peripheral surface and a side surface 2b side of the piston ring 1 abutting against a side surface of the ring groove to form a seal surface. The piston ring 1 according to the present embodiment can be used for both a first ring (first ring counted from the combustion chamber side) and a second ring (second ring counted from the combustion chamber side) attached to the outer peripheral surface of a piston.

The piston ring 1 is provided with an annular main body portion 2 and a joint portion 3 formed at a part of the main body portion 2. The main body portion 2 has a substantially rectangular cross-sectional shape having a long side in a thickness direction, having a short side in a width direction, and caused by a pair of a side surface 2a and the side surface 2b as width-direction end surfaces and an inner peripheral surface 2c and the outer peripheral surface 2d as thickness-direction end surfaces. The outer peripheral surface 2d is inclined as described later, and thus the lengths of the side surface 2a and the side surface 2b are different from each other. The cross-sectional shape is not limited to the shape described above. The piston ring 1 is attached to the piston such that the side surface 2a is on the combustion chamber side and the side surface 2b is on the crank chamber side. Each of the pair of side surfaces 2a and 2b is provided so as to interconnect the inner peripheral surface 2c and the outer peripheral surface 2d.

The joint portion 3 includes joint end portions 11 and 12 provided in both end portions of the annular main body portion 2. The joint end portions 11 and 12 are in a state of facing each other with a predetermined interval in a state where the piston ring 1 is yet to be mounted in the ring groove.

Figure 2:
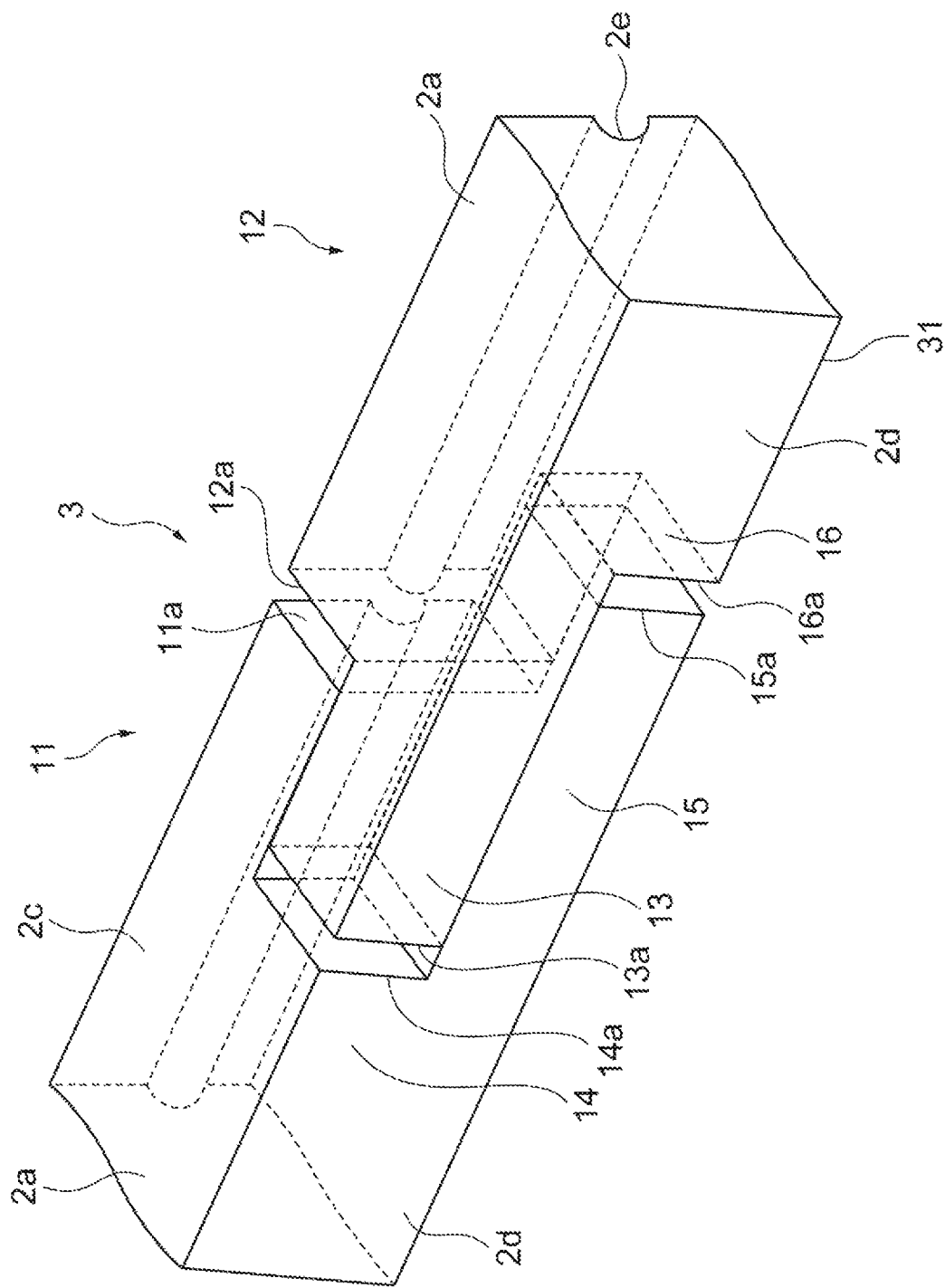
FIG. 2 is a perspective view describing the structure of a joint portion.
Figure 3:
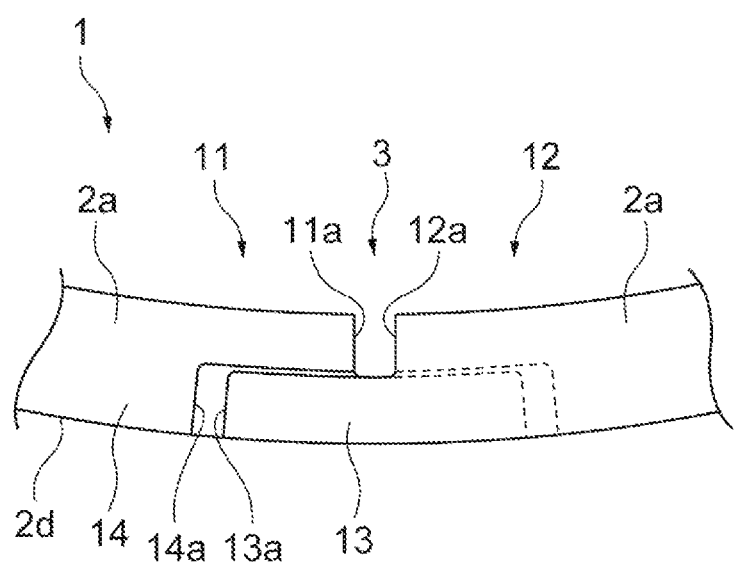
FIG. 3(A) is a plan view of the joint portion and FIG. 3(B) is a front view of the joint portion.
Figure 3:
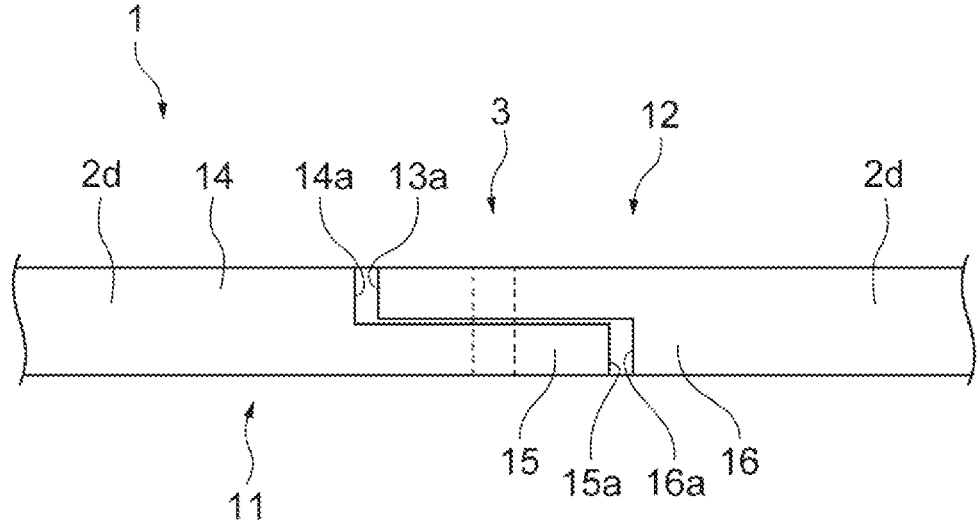

FIGS. 2 and 3 are diagrams describing the structure of the joint portion 3. FIG. 2 is a perspective view describing the structure of the joint portion 3, FIG. 3(A) is a plan view of the joint portion 3 (viewed from the side surface 2a side), and FIG. 3(B) is a front view of the joint portion 3 (viewed from the outer peripheral surface 2d side). In the piston ring 1, the joint portion 3 has a so-called triple step shape. The triple step shape means that the joint portion 3 has a step shape when viewed from three directions. In the case of the piston ring 1 of the present embodiment, the joint portion 3 has a step shape when viewed from the upper side surface 2a side, when viewed from the lower side surface 2b side, and when viewed from the outer peripheral surface 2d side.

More specifically, as illustrated in FIGS. 2 and 3, the facing surfaces of the joint end portion 11 and the joint end portion 12 are uneven in substantially half of the main body portion 2 on the outer peripheral surface 2d side, as compared with facing surfaces 11a and 12a in substantially half of the main body portion 2 on the inner peripheral surface 2c side, such that the joint end portion 12 protrudes to the joint end portion 11 side on the side surface 2a side and the joint end portion 11 protrudes to the joint end portion 12 side on the side surface 2b side.

Specifically, in substantially half of the main body portion 2 on the outer peripheral surface 2d side and substantially half of the main body portion 2 on the side surface 2a side (at the part that is substantially the upper half in FIG. 2), the joint end portion 12 is provided with a first protruding portion 13 protruding to the joint end portion 11 side beyond the facing surface 12a and the joint end portion 11 is provided with a first receiving portion 14 receiving the first protruding portion 13. A distal end surface 13a of the first protruding portion 13 and a receiving surface 14a of the first receiving portion 14 face each other. In substantially half of the main body portion 2 on the outer peripheral surface 2d side and substantially half of the main body portion 2 on the side surface 2b side (at the part that is substantially the lower half in FIG. 2), the joint end portion 11 is provided with a second protruding portion 15 protruding to the joint end portion 12 side beyond the facing surface 11a and the joint end portion 12 is provided with a second receiving portion 16 receiving the second protruding portion 15. A distal end surface 15a of the second protruding portion 15 and a receiving surface 16a of the second receiving portion 16 face each other.

As a result, the positions where the facing surfaces 11a and 12a are provided and the positions where the distal end surface 13a of the first protruding portion 13 and the receiving surface 14a of the first receiving portion 14 are provided are different from each other along the longitudinal direction of the main body portion 2 as illustrated in FIG. 3(A) when viewed from the side surface 2a side and a step shape results from the difference. The positions where the distal end surface 13a of the first protruding portion 13 and the receiving surface 14a of the first receiving portion 14 are provided and the positions where the distal end surface 15a of the second protruding portion 15 and the receiving surface 16a of the second receiving portion 16 are provided are different from each other along the longitudinal direction of the main body portion 2 as illustrated in FIG. 3(B) when viewed from the outer peripheral surface 2d side and a step shape results from the difference. The positions where the facing surfaces 11a and 12a are provided and the positions where the distal end surface 15a of the second protruding portion 15 and the receiving surface 16a of the second receiving portion 16 are provided are different from each other along the longitudinal direction of the main body portion 2 as illustrated in FIG. 2 when viewed from the side surface 2b side and a step shape results from the difference. The step-shaped step region (step-split position) on each surface is substantially near the middle. In this manner, the joint portion 3 according to the present embodiment has a triple step shape. As illustrated in FIGS. 2 and 3, an air gap is provided between the facing surface 11a and the facing surface 12a, an air gap is provided between the distal end surface 13a of the first protruding portion 13 and the receiving surface 14a of the first receiving portion 14, and an air gap is provided between the distal end surface 15a of the second protruding portion 15 and the receiving surface 16a of the second receiving portion 16.

FIG. 4(A) is a schematic cross-sectional view of the main body portion 2 of the piston ring 1 and corresponds to a cross-sectional view taken along line IV-IV in FIG. 1. FIG. 4(B) is a schematic cross-sectional view of the joint end portion 12 of the piston ring 1 and corresponds to a cross-sectional view taken along line B-B in FIG. 1.

Figure 4:
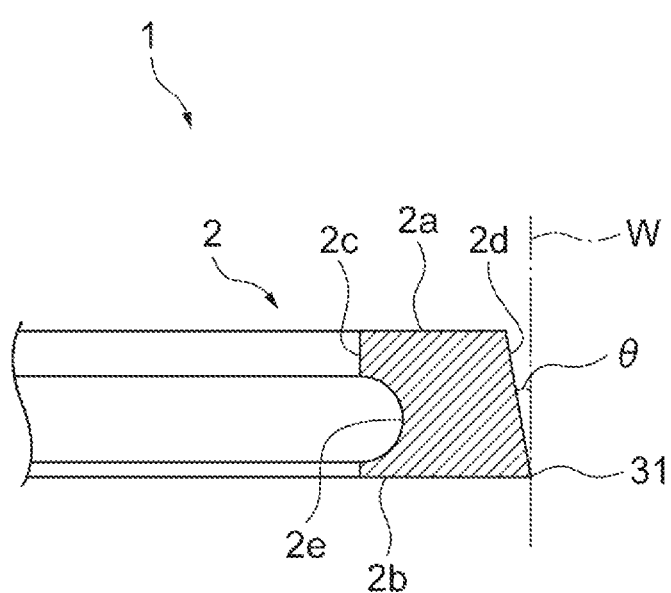
FIG. 4(A) is a cross-sectional view of a main body portion and corresponds to a cross-sectional view taken along line IV-IV in FIG. 1.
FIG. 4(B) is a schematic cross-sectional view of a joint end portion and corresponds to a cross-sectional view taken along line B-B in FIG. 1.
Figure 4:
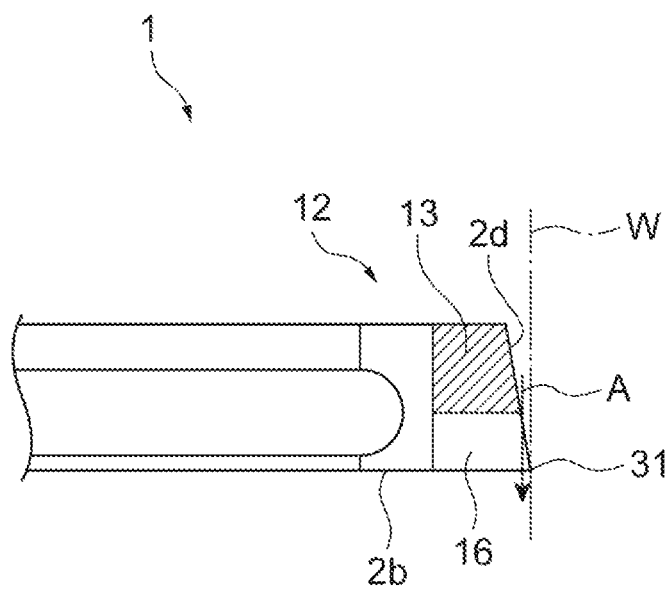

As illustrated in FIGS. 2 and 4, the piston ring 1 according to the present embodiment has a tapered shape having a tapered surface (taper face), in which the diameter of the outer peripheral surface 2d increases from the upper side surface 2a (one side surface) side toward the lower side surface 2b (the other side surface) side. FIG. 4(A) illustrates a cross section of the main body portion 2 of the piston ring 1. In the piston ring 1, the entire outer peripheral surface 2d is a tapered surface. Accordingly, the periphery of the joint portion 3 is also a tapered surface as illustrated in FIG. 2. Specifically, as illustrated in FIG. 4(B), the outer peripheral surface 2d side of the first protruding portion 13 is a tapered surface in the joint end portion 12. Likewise, the outer peripheral surface 2d side of the second protruding portion 15 is also a tapered surface in the joint end portion 11. In the piston ring 1 having the tapered surfaces, the region where the outer diameter of the piston ring 1 is the largest slides in contact with the bore inner peripheral surface. In the case of the piston ring 1 of the present embodiment, the diameter is the largest in a corner portion 31 formed by the side surface 2b and the outer peripheral surface 2d. Accordingly, in a case where the piston ring 1 is attached, the corner portion 31 between the side surface 2b and the outer peripheral surface 2d slides in contact with the bore inner peripheral surface. By such a configuration being adopted, the area of contact with the bore inner peripheral surface of a cylinder is reduced, and thus the initial adaptability of oil is enhanced. In addition, by the area of contact between the piston ring 1 and the bore inner peripheral surface being reduced, an increase in contact surface pressure is achieved and the oil that adheres to the bore inner peripheral surface can be scraped well.

An inclination angle $\theta$ of the outer peripheral surface 2d formed by the tapered surface (see FIG. 4: the angle of the outer peripheral surface 2d with respect to the axial direction of the piston ring) can be 1° to 10°. By the outer peripheral surface 2d including a tapered surface and the inclination angle $\theta$ being 1° to 10° as described above, the oil scraping effect of the outer peripheral surface 2d of the piston ring 1 is enhanced and a reduction in oil consumption amount can be achieved.

As illustrated in FIGS. 2 and 4, the piston ring 1 is provided with a spring groove 2e, which accommodates a coil spring disposed inside the piston ring 1, in the inner peripheral surface 2c of the main body portion 2. The coil spring that is accommodated in the spring groove 2e is provided so that the piston ring 1 is pressed radially outward when the piston ring 1 is attached to the ring groove in the piston outer peripheral surface and inserted in the bore of the cylinder. As illustrated in FIG. 4, in the piston ring 1 of the present embodiment, the spring groove 2e is not provided near the middle of the inner peripheral surface 2c (region where the distances from the side surface 2a and the side surface 2b are equal to each other) and the spring groove 2e is provided at a position closer to the side surface 2b side, that is, the crank chamber side than the vicinity of the middle. The position where the spring groove 2e is provided can be appropriately changed insofar as the coil spring attached to the spring groove 2e is not separated from the piston ring 1 when the piston is operated. By the position where the spring groove 2e is provided being moved to the side surface 2b side (crank chamber side) from the vicinity of the middle, the piston ring 1 can be slid in contact in a state where the adhesion between the bore inner peripheral surface and the outer peripheral surface 2d of the piston ring 1 having a tapered surface is enhanced.

A leaf spring (flat spring) may be used instead of the coil spring as a means for pressing the piston ring 1 radially outward. The shape of the spring is not limited to the above insofar as the spring has the function of pressing the piston ring 1 radially outward. The shape of the inner peripheral surface 2c can be appropriately changed in accordance with the shape of the spring. When the shape of the spring remains the same, the shape of the inner peripheral surface 2c of the piston ring 1 can be appropriately changed within a range in which the radially outward pressing force of the spring can be received.

Figure 5:
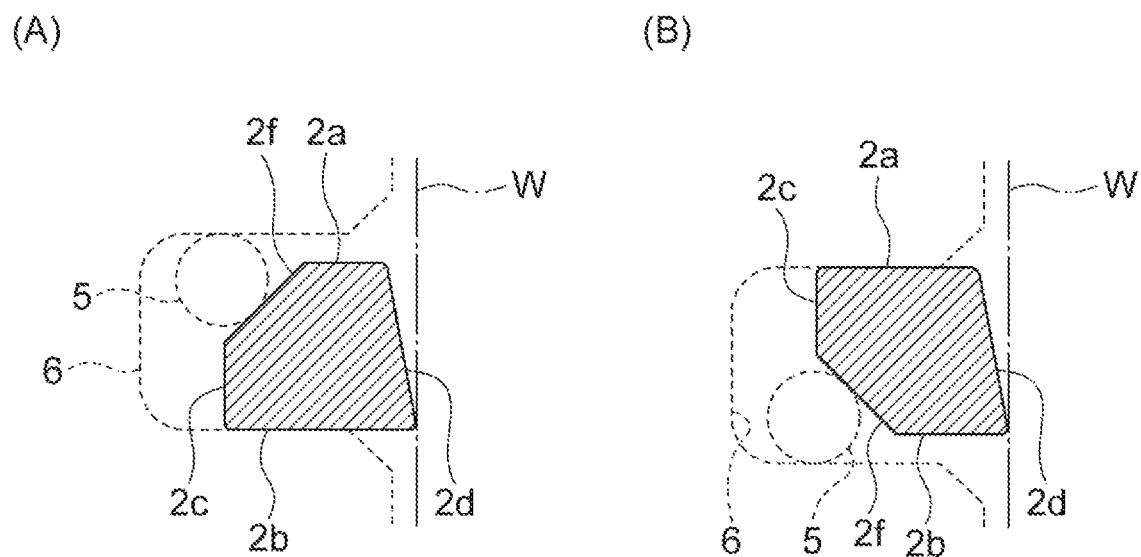
FIGS. 5(A) and 5(B) illustrate examples in which an inner peripheral surface has different shapes.

FIG. 5 illustrates examples in which the inner peripheral surface 2c has different shapes. In the example illustrated in FIG. 5(A), a spring abutting surface 2f abutting against a coil spring 5 provided inside the piston ring 1 is formed by the connection part between the inner peripheral surface 2c and the side surface 2a being notched. The piston ring 1 provided with the coil spring 5 and the spring abutting surface 2f is attached to a ring groove 6 in the piston outer peripheral surface and inserted into the bore of the cylinder, and then the coil spring 5 presses the spring abutting surface 2f in a state of having moved to the side where the spring abutting surface 2f is provided (here, the side surface 2a side) as illustrated in FIG. 5(A). The spring abutting surface may be provided at the connection part between the inner peripheral surface 2c and the side surface 2b. In the example illustrated in FIG. 5(B), the spring abutting surface 2f is provided on the side surface 2b side. In this case, the coil spring 5 presses the spring abutting surface 2f in a state of having moved to the side where the spring abutting surface 2f is provided (here, the side surface 2b side) as illustrated in FIG. 5(B) by the piston ring 1 provided with the coil spring 5 and the spring abutting surface 2f being attached to the ring groove 6 in the piston outer peripheral surface and inserted into the bore of the cylinder. The shape of the inner peripheral surface 2c can be appropriately changed as described above.

The piston ring 1 is made of resin. In the present embodiment, the piston ring 1 being made of resin means that the ratio of the resin that is contained in the material forming the piston ring 1 is 50% or more. The resin that forms the piston ring 1 is not particularly limited and a high-strength and heat-resistant resin can be selected. Examples of the high-strength and heat-resistant resin include super engineering plastics represented by polyether ether ketone (PEEK), polyphenylene sulfide (PPS), or the like. Polybenzimidazole (PBI) having higher heat resistance can also be used. Also usable are polyimide (PI), polyamide (PA), polyamide-imide (PAI), polytetrafluoroethylene (PTFE), polyetherketone (PEK), polyetherketoneetherketoneketone (PEKEKK), liquid crystal polymer (LCP), and so on. The materials described above can be injection-molded and even a joint portion that is complex in shape as in the piston ring 1 of the present embodiment can be formed with ease. Methods for manufacturing the piston ring 1 are not limited to injection molding. For example, the joint portion may be formed by means of a thin blade cutter after resin powder is compression-molded into a ring shape.

Strength enhancement can be achieved along with a further increase in heat resistance when the constituent material of the piston ring 1 is a fiber-reinforced resin containing a carbon fiber or a glass fiber. In addition, a filling material or the like may be added to the resin material used for the piston ring 1. Examples of the filling material include molybdenum, metal powder (Cu, Fe), graphite, polytetrafluoroethylene (PTFE), bronze, mica, zinc oxide (ZnO), and talc.

A film (surface treatment film) for wear resistance enhancement may be formed on the outer peripheral surface 2d of the piston ring 1. The material of the film for wear resistance enhancement is not particularly limited and usable are, for example, diamond-like carbon (DLC), hard chromium plating, composite dispersion plating, and metal nitrides and carbides. Methods for forming the film on the outer peripheral surface 2d are not particularly limited. For example, electroless plating, electroplating, and physical vapor deposition (PVD) can be used.

The film (surface treatment film) may be provided on a surface different from the outer peripheral surface 2d. In other words, the film may be provided on at least one of the side surfaces 2a and 2b of the piston ring 1, the inner peripheral surface 2c of the piston ring 1, the outer peripheral surface 2d of the piston ring 1, and the jointing surface of the joint portion 3 (surface facing the joint end portion 12 in the joint end portion 11 or surface facing the joint end portion 11 in the joint end portion 12). In this case, the wear resistance of the surface provided with the film is enhanced.

Since the piston ring 1 is made of resin, the piston ring 1 is smaller in specific gravity than existing metallic piston rings. Accordingly, the ring is unlikely to be lifted and the piston ring is capable of enhancing side surface sealability. The resinous piston ring 1 has a small elastic modulus, and thus the followability in a case where the piston ring 1 has moved in the ring groove is also high. The joint portion 3 of the piston ring 1 has a triple step shape. Accordingly, after attachment to the piston, it is possible to reduce the gas flow area formed between the side surface 2a side (combustion chamber side) and the side surface 2b side (crank chamber side) and a reduction in gas amount can be achieved. Accordingly, gas sealability improvement and blow-by gas suppression can be achieved by means of the piston ring 1. The outer peripheral surface 2d of the piston ring 1 has a tapered surface, and thus the oil scraping effect of the outer peripheral surface 2d of the piston ring 1 is enhanced and the amount of oil consumption can be reduced. In a case where the outer peripheral surface 2d as a whole is configured to slide in contact in a state of abutting against the bore inner peripheral surface, there is room for improvement in terms of the amount of oil consumption although gas sealability improvement and blow-by gas suppression can be achieved. In contrast, the outer peripheral surface 2d has a tapered surface, and thus it is possible to reduce the oil consumption amount by enhancing the oil scraping performance.

The outer peripheral surface 2d does not have to be tapered in whole. The vicinity of the corner portion 31 may not be a tapered surface and may be configured to be parallel ($\theta=0°$) to the bore inner peripheral surface (that is, the axial direction of the piston ring) such that the region where the outer peripheral surface 2d and the bore inner peripheral surface abut against each other is enlarged in the vicinity of the corner portion 31 on the outer peripheral surface 2d.

Modification Example-1

Figure 6:
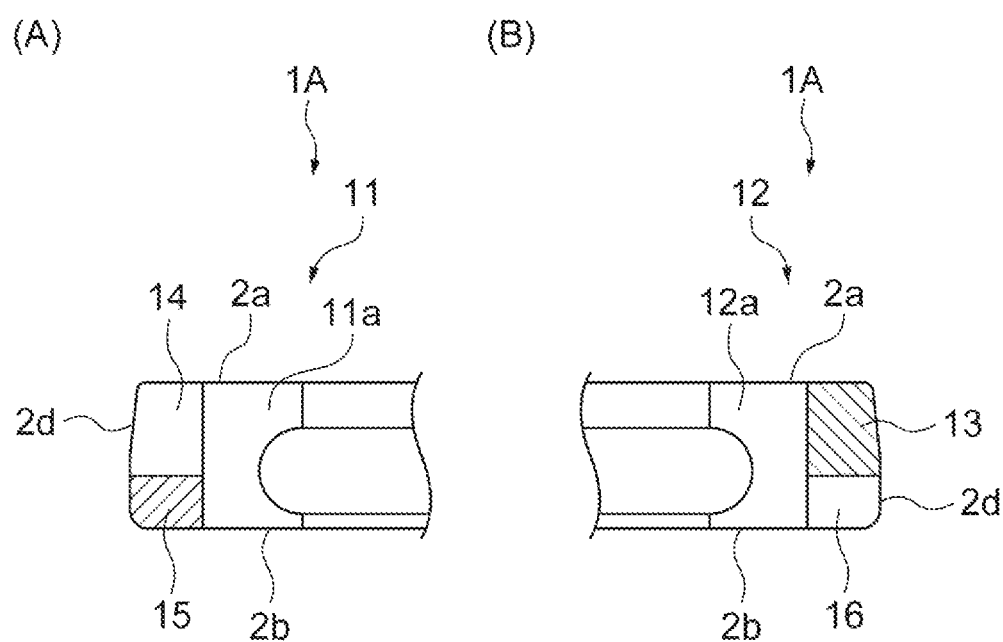
FIG. 6(A) is a schematic cross-sectional view of the joint end portion of a piston ring 1A and corresponds to a cross-sectional view taken along line A-A in FIG. 1.
FIG. 6(B) is a schematic cross-sectional view of the joint end portion 12 of the piston ring 1A and corresponds to a cross-sectional view taken along line B-B in FIG. 1.

Next, piston rings according to modification examples of the present embodiment will be described. A piston ring 1A according to a first modification example is illustrated in FIG. 6. FIG. 6(A) is a schematic cross-sectional view of the joint end portion 11 of the piston ring 1A and corresponds to a cross-sectional view taken along line A-A in FIG. 1. In FIG. 6(A), the second protruding portion 15 of the joint end portion 11 is illustrated in cross section. FIG. 6(B) is a schematic cross-sectional view of the joint end portion 12 of the piston ring 1A and corresponds to a cross-sectional view taken along line B-B in FIG. 1. In FIG. 6(B), the first protruding portion 13 of the joint end portion 12 is illustrated in cross section.

The difference between the piston ring 1A according to the first modification example and the piston ring 1 is as follows. First, although the outer peripheral surface 2d of the piston ring 1A has a tapered shape as in the case of the piston ring 1, the outer peripheral surface 2d is not tapered in whole, only a part (substantially half in FIG. 6) on the side surface 2a side is a tapered surface, and the remaining part on the side surface 2b side is not inclined ($\theta=0°$). Although the periphery of the joint end portions 11 and 12 of the piston ring 1A is illustrated in FIG. 6, only a part on the side surface 2a side is similarly a tapered surface in the main body portion 2.

The step shaped step portion (split position) that is formed by the protruding portion and the receiving portion and formed continuously on the outer peripheral surface 2d is moved to the side surface 2b side from the vicinity of the middle between the side surface 2a and the side surface 2b. In other words, as illustrated in FIG. 6(A), the width of the first receiving portion 14 (the length of the piston ring 1A in the width direction) is larger than the width of the second protruding portion 15. In addition, as illustrated in FIG. 6(B), the width of the first protruding portion 13 (the length of the piston ring 1A in the width direction) is larger than the width of the second receiving portion 16. As a result, the end portion of the step-shaped step portion that is on the outer peripheral surface 2d side is provided at a position different from the tapered surface.

Blow-by gas can be further suppressed as compared with the piston ring 1 by the structure of the piston ring 1A described above being adopted. As described above, the piston ring 1 realizes blow-by gas suppression by adopting the triple step-shaped joint portion 3. In the structure, however, only the corner portion 31 formed by the outer peripheral surface 2d and the side surface 2b abuts against the bore inner peripheral surface by the entire outer peripheral surface 2d being a tapered surface. As illustrated in FIG. 2, in this case, a gas movement path from the side surface 2a side to the side surface 2b side is formed in the vicinity of the facing surfaces of the distal end surface 15a of the second protruding portion and the receiving surface 16a of the second receiving portion 16. The disposition of a bore inner peripheral surface W when the piston ring 1 is attached is indicated by a broken line in FIG. 4(B), and a gas movement path is formed at the part that is indicated by an arrow A. As a result, a small amount of blow-by gas may be generated.

In the configuration of the piston ring 1A according to the modification example, in contrast, the step-shaped step portion (split position) is moved to the side surface 2b side and the end portion on the outer peripheral surface 2d side is provided at a position different from the tapered surface. In addition, in the piston ring 1A, the tapered surface of the outer peripheral surface 2d is formed only on the side surface 2a side. As a result, the outer peripheral surface 2d on the second protruding portion 15 and second receiving portion 16 side is not a tapered surface and abuts against the bore inner peripheral surface whereas the outer peripheral surface 2d on the first protruding portion 13 and first receiving portion 14 side is a tapered surface in part.

As is the case with the piston ring 1, the joint portion 3 has a triple step shape in the piston ring 1A having the structure described above. Accordingly, gas sealability improvement and blow-by gas suppression can be achieved. In addition, also in the piston ring 1A, the outer peripheral surface 2d is tapered in part, and thus the oil scraping effect of the outer peripheral surface 2d of the piston ring 1 is enhanced and a reduction in oil consumption amount can be achieved. Further, the step-shaped step portion (split position) and the outer peripheral surface 2d of the second protruding portion 15 and the second receiving portion 16 closer to the side surface 2b side than the step portion are not inclined and thus abut against the bore inner peripheral surface. Accordingly, no gas movement path is formed in the vicinity of the facing surfaces of the distal end surface 15a of the second protruding portion and the receiving surface 16a of the second receiving portion 16 and the blow-by gas suppression effect is enhanced.

Modification Example-2

Figure 7:
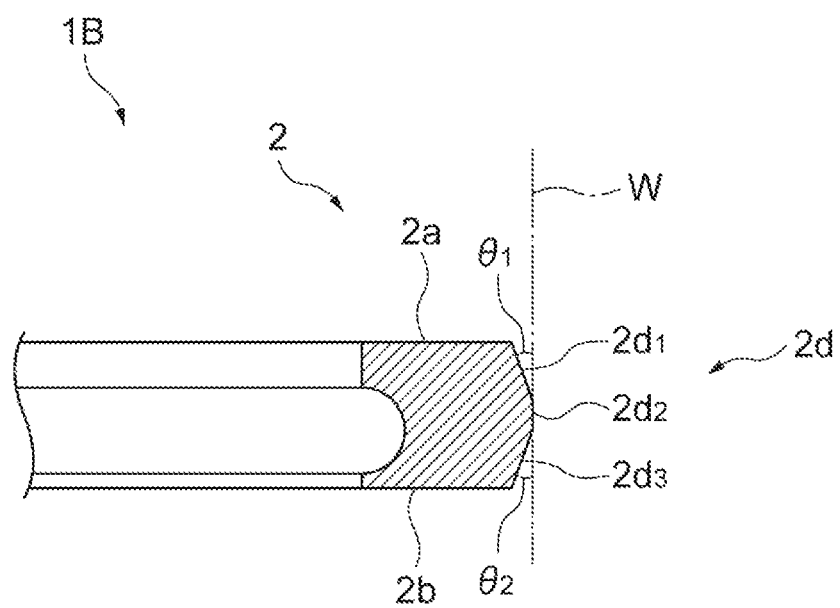
FIG. 7 is a schematic cross-sectional view of the main body portion of a piston ring 1B.
Figure 8:
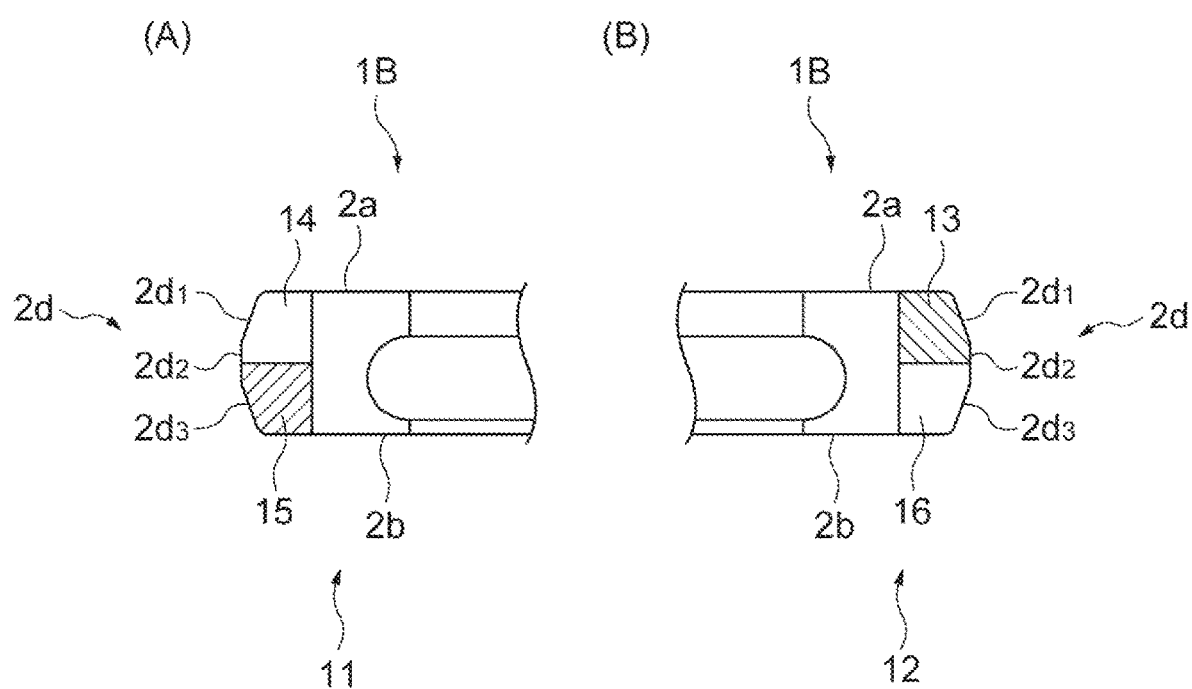
FIG. 8(A) is a schematic cross-sectional view of the joint end portion of the piston ring 1B and corresponds to a cross-sectional view taken along line A-A in FIG. 1.
FIG. 8(B) is a schematic cross-sectional view of the joint end portion of the piston ring 1B and corresponds to a cross-sectional view taken along line B-B in FIG. 1.

A piston ring 1B according to a second modification example is illustrated in FIGS. 7 and 8. FIG. 7 is a schematic cross-sectional view of the main body portion 2 of the piston ring 1B. FIG. 8(A) is a schematic cross-sectional view of the joint end portion 11 of the piston ring 1B and corresponds to a cross-sectional view taken along line A-A in FIG. 1. In FIG. 8(A), the second protruding portion 15 of the joint end portion 11 is illustrated in cross section. FIG. 8(B) is a schematic cross-sectional view of the joint end portion 12 of the piston ring 1B and corresponds to a cross-sectional view taken along line B-B in FIG. 1. In FIG. 8(B), the first protruding portion 13 of the joint end portion 12 is illustrated in cross section.

The difference between the piston ring 1B according to the second modification example and the piston ring 1 is as follows. First, although the outer peripheral surface 2d of the piston ring 1B includes a tapered shape as in the case of the piston ring 1, the outer peripheral surface 2d is not tapered in whole and only a part on the side surface 2a side is a tapered surface. The remaining part on the side surface 2b side is not inclined ($\theta=0°$) in the piston ring 1A whereas the remaining part in the piston ring 1B has an uninclined region and a reverse tapered surface having a reverse tapered shape ($\theta<0°$).

Specifically, as illustrated in FIG. 7, the outer peripheral surface 2d of the piston ring 1B has a tapered surface $2d_1$, a flat surface $2d_2$, and a reverse tapered surface $2d_3$ disposed in this order from the side surface 2a side toward the side surface 2b side. As for the tapered surface $2d_1$, an inclination angle $\theta_1$ with respect to the bore inner peripheral surface W can be 1° to 20°. The width of the tapered surface $2d_1$ (the length of the tapered surface $2d_1$ in the width direction of the piston ring 1B) can be 30% to 50% of the width of the piston ring 1B. The flat surface $2d_2$ is a region abutting against the bore inner peripheral surface W and sliding. The flat surface $2d_2$ is a surface extending along the axial direction of the piston ring 1. The width of the flat surface $2d_2$ (the length of the flat surface $2d_2$ in the width direction of the piston ring 1B) can be 0% to 40% of the width of the piston ring 1B. In other words, the flat surface $2d_2$ may not be provided between the tapered surface $2d_1$ and the reverse tapered surface $2d_3$. In a case where the flat surface $2d_2$ is provided, it is preferable that the width of the flat surface $2d_2$ is 3% to 40% of the width of the piston ring 1B. The reverse tapered surface $2d_3$ is a region where the diameter of the outer peripheral surface $2d$ decreases toward the side surface $2b$ side. As for the reverse tapered surface $2d_3$, an inclination angle $\theta_2$ with respect to the bore inner peripheral surface W can be 10° to 70°. It is preferable that the inclination angle $\theta_2$ is 10° to 50° and $\theta_2$ exceeds $\theta_1$. The width of the reverse tapered surface $2d_3$ (the length of the reverse tapered surface $2d_3$ in the width direction of the piston ring 1B) can be 30% to 50% of the thickness of the piston ring 1B.

As illustrated in FIGS. 8(A) and 8(B), in the vicinity of the joint portion 3, the step-shaped step portion (split position) is provided so as to be at the flat surface $2d_2$ near the middle. In other words, the outer peripheral surface $2d$ at the boundary between the first receiving portion 14 and the second protruding portion 15 and the outer peripheral surface $2d$ at the boundary between the first protruding portion 13 and the second receiving portion 16 are at the flat surface $2d_2$. Accordingly, the outer peripheral surface $2d$ of the first protruding portion 13 and the first receiving portion 14 is formed by the tapered surface $2d_1$ and the flat surface $2d_2$. The outer peripheral surface $2d$ of the second protruding portion 15 and the second receiving portion 16 is formed by the contact region $2d_2$ and the reverse tapered surface $2d_3$.

As is the case with the piston ring 1, the joint portion 3 has a triple step shape in the piston ring 1B having the structure described above. Accordingly, gas sealability improvement and blow-by gas suppression can be achieved. In addition, in the piston ring 1B, a part of the outer peripheral surface $2d$ is the tapered surface $2d_1$, and thus oil scraping effect by the outer peripheral surface $2d$ of the piston ring 1, especially the effect of suppressing upward oil scraping to the combustion chamber side is enhanced. Since the outer peripheral surface $2d$ side of the step-shaped step portion (split position) is the flat surface $2d_2$, a gas movement using the outside of the outer peripheral surface $2d$ can be suppressed, and thus the blow-by gas suppression effect is enhanced as compared with the piston ring 1. When the reverse tapered surface $2d_3$ is formed closer to the side surface $2b$ side than the flat surface $2d_2$ on the outer peripheral surface $2d$, the oil scraping effect by the outer peripheral surface $2d$ of the piston ring 1B, especially the effect of promoting downward oil scraping to the crank chamber side is enhanced. Accordingly, both blow-by gas suppression and a reduction in oil consumption amount can be achieved also in the piston ring 1B. The effect described above is noticeable in a case where the inclination angle $\theta_1$ of the tapered surface $2d_1$ with respect to the bore inner peripheral surface W and the inclination angle $\theta_2$ of the reverse tapered surface $2d_3$ with respect to the bore inner peripheral surface W satisfy the relationship of $\theta_1 < \theta_2$. However, even in a case where the relationship of $\theta_1 \geq \theta_2$ is satisfied, the oil consumption amount reduction effect is enhanced by the reverse tapered surface being provided.

Modification Example-3

Figure 9:
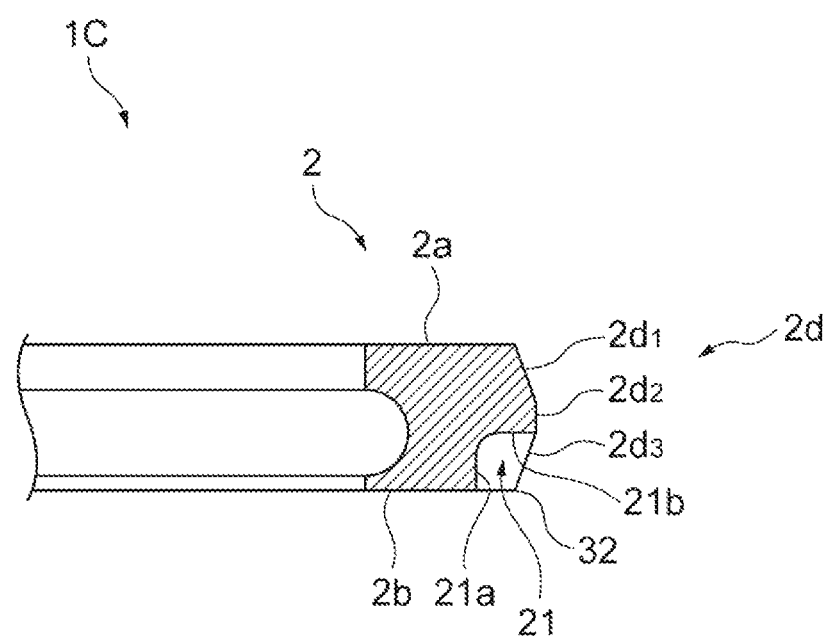
FIG. 9 is a cross-sectional view of the main body portion of a piston ring 1C.
Figure 10:
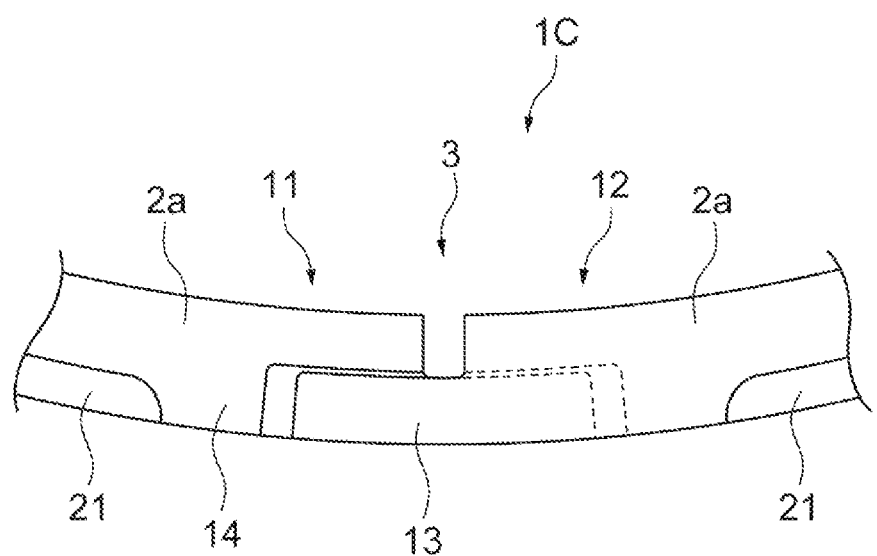
FIG. 10(A) is a plan view of the joint portion in the piston ring 1C and FIG. 10(B) is a front view of the joint portion in the piston ring 1C.
Figure 10:
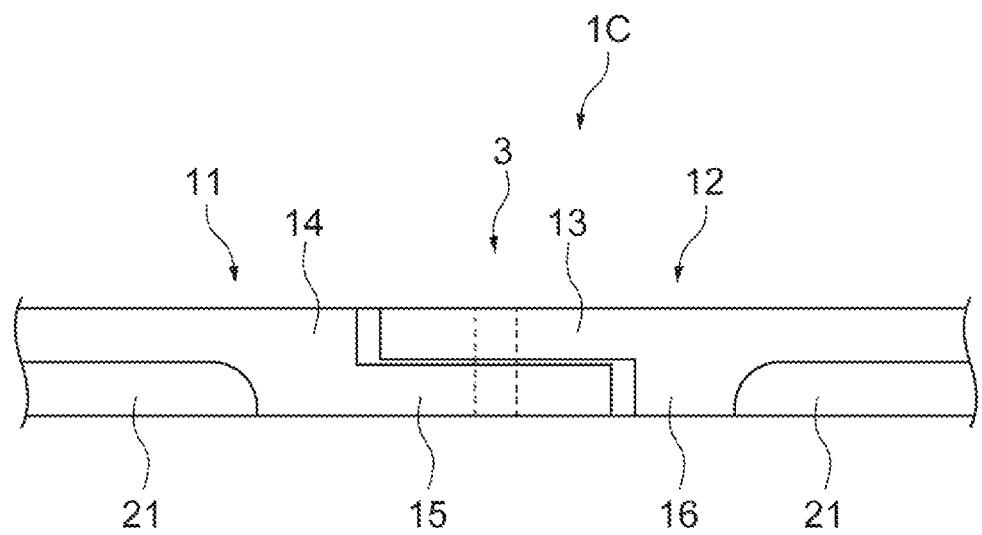
Figure 11:
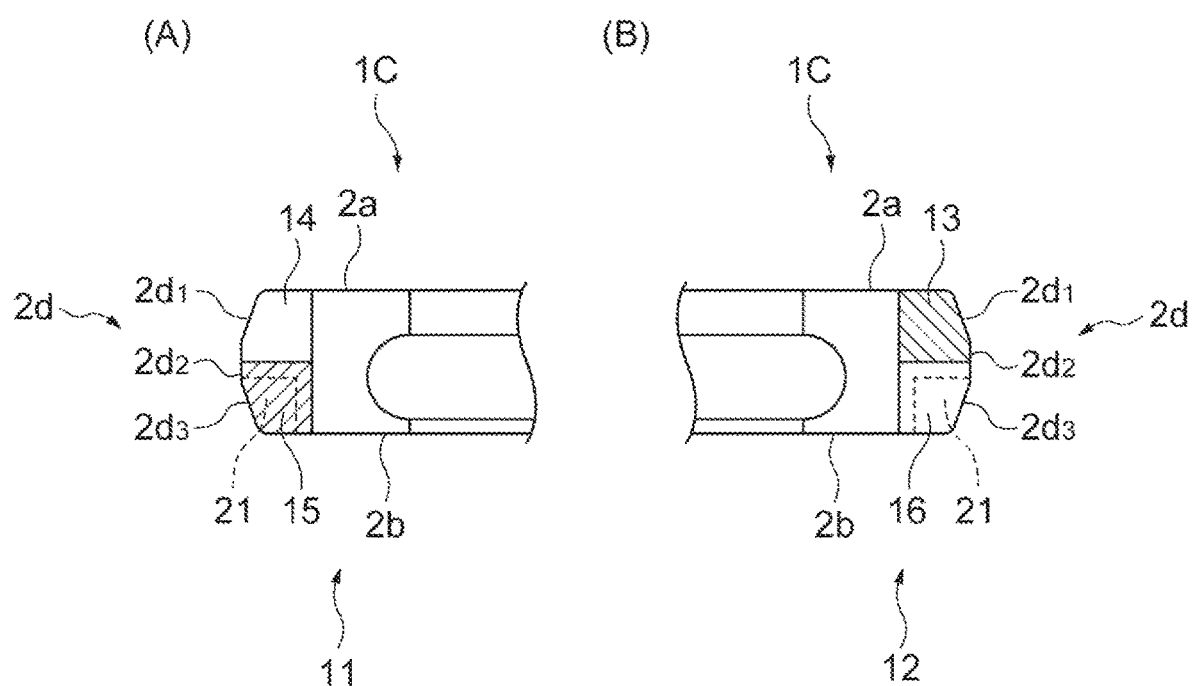
FIG. 11(A) is a schematic cross-sectional view of the joint end portion of the piston ring 1C and corresponds to a cross-sectional view taken along line A-A in FIG. 11.
FIG. 11(B) is a schematic cross-sectional view of the joint end portion of the piston ring 1C and corresponds to a cross-sectional view taken along line B-B in FIG. 1.

A piston ring 1C according to a third modification example is illustrated in FIGS. 9, 10, and 11. FIG. 9 is a cross-sectional view of the main body portion 2 of the piston ring 1C. FIG. 10(A) is a plan view of the joint portion 3 in the piston ring 1C (viewed from the side surface $2a$ side) and FIG. 10(B) is a front view of the joint portion 3 in the piston ring 1C (viewed from the outer peripheral surface $2d$ side). FIG. 11(A) is a schematic cross-sectional view of the joint end portion 11 of the piston ring 1C and corresponds to a cross-sectional view taken along line A-A in FIG. 1. FIG. 11(B) is a schematic cross-sectional view of the joint end portion 12 of the piston ring 1C and corresponds to a cross-sectional view taken along line B-B in FIG. 1.

The difference between the piston ring 1C according to the third modification example and the piston ring 1B according to the second modification example is as follows. In the piston ring 1C, a notch portion 21 (undercut) is provided in a corner portion 32, which is formed by the side surface $2b$ and the outer peripheral surface $2d$, as indicated by a virtual line in FIG. 9. In other words, the notch portion 21 is provided at a part of the main body portion 2 on the side surface $2b$ side and the outer peripheral surface $2d$ side. The notch portion 21 is formed at a position corresponding to a part of the flat surface $2d_2$ continuous from the reverse tapered surface $2d_3$ and the reverse tapered surface $2d_3$ of the outer peripheral surface $2d$ of the piston ring 1B according to the second modification example. Accordingly, a part of the flat surface $2d_2$ and the tapered surface $2d_1$ are present on the outer peripheral surface $2d$ of the piston ring 1C.

The notch portion 21 may be formed when the piston ring 1C is injection-molded. The notch portion 21 may be formed by a part of the main body portion 2 on the side surface $2b$ side and the outer peripheral surface $2d$ side being cut out by means of a cutting jig, a grinding jig, a polishing jig, or the like.

The notch portion 21 has a first surface $21a$ facing the outer peripheral surface $2d$ side and a second surface $21b$ facing the side surface $2b$. The angle formed by the first surface $21a$ and the second surface $21b$ can be, for example, a right angle (90°) and the angle is not particularly limited. The shape of the boundary part between the first surface $21a$ and the second surface $21b$ is not particularly limited. The depth of the notch portion 21 (the length of the first surface $21a$ along the width direction of the piston ring 1C and the length of the second surface $21b$ along the thickness (radial) direction of the piston ring 1C) can be appropriately changed. For example, in the piston ring 1C, the length of the first surface $21a$ along the width direction of the piston ring 1C is approximately ⅕ to approximately half of the width of the piston ring 1C and the length of the second surface $21b$ along the radial direction of the piston ring 1C is approximately ⅕ to approximately half of the thickness of the piston ring 1C (thickness of the main body portion 2).

The notch portion 21 may be provided also in the joint end portions 11 and 12 forming the joint portion 3. In other words, the notch portion 21 may be formed over the entire circumference of the piston ring 1C. The piston ring 1C described in the third modification example is an interrupt-type piston ring in which the notch portion 21 is not formed in the joint portion 3. Specifically, as illustrated in FIGS. 10(A) and 10(B), the notch portion 21 formed along the corner portion 31 of the main body portion 2 is terminated before reaching the joint end portion 11 and the joint end portion 12. As a result, the joint end portions 11 and 12 and the notch portion 21 do not overlap each other in plan view. Accordingly, the shapes of the joint end portion 11 and the joint end portion 12 in the piston ring 1C are same as those in the piston ring 1B. Specifically, as illustrated in FIGS. 11(A) and 11(B), the outer peripheral surface $2d$ of the first protruding portion 13 and the first receiving portion 14 is formed by the tapered surface $2d_1$ and the flat surface $2d_2$ in the piston ring 1C. The outer peripheral surface $2d$ of the second protruding portion 15 and the second receiving portion 16 is formed by the contact region $2d_2$ and the reverse tapered surface $2d_3$ in the piston ring 1C.

As is the case with the piston ring 1, the joint portion 3 has a triple step shape in the piston ring 1C having the structure described above. Accordingly, gas sealability improvement and blow-by gas suppression can be achieved. In addition, in the piston ring 1C, a part of the outer peripheral surface 2*d* is the tapered surface $2d_1$, and thus oil scraping effect by the outer peripheral surface 2*d* of the piston ring 1, especially the effect of suppressing upward oil scraping to the combustion chamber side is enhanced. Since the outer peripheral surface 2*d* side of the step-shaped step portion (split position) is the flat surface $2d_2$, a gas movement using the outside of the outer peripheral surface 2*d* can be suppressed, and thus the blow-by gas suppression effect is enhanced as compared with the piston ring 1. Further, the notch portion 21 is formed, with the exception of the joint portion 3, on the side of the outer peripheral surface 2*d* that is closer to the side surface 2*b* than the flat surface $2d_2$. Accordingly, the oil scraping effect by the outer peripheral surface 2*d* of the piston ring 1C, especially the effect of promoting downward oil scraping to the crank chamber side is enhanced by the notch portion 21. Accordingly, both blow-by gas suppression and a reduction in oil consumption amount can be achieved also in the piston ring 1C.

Even in a case where the flat surface $2d_2$ is not provided between the tapered surface $2d_1$ and the reverse tapered surface $2d_3$, a gas movement using the outside of the outer peripheral surface 2*d* can be suppressed and the blow-by gas suppression effect is enhanced as compared with the piston ring 1 by the outer peripheral surface 2*d* side of the step-shaped step portion (split position) being at the boundary part between the tapered surface $2d_1$ and the reverse tapered surface $2d_3$.

In a case where the notch portion 21 is formed over the entire circumference of the piston ring 1C including the joint end portions 11 and 12 forming the joint portion 3, the notch portion 21 is formed as indicated by a virtual line in FIGS. 11(A) and 11(B). The notch portion 21 being formed with respect to a protruding portion of a joint end portion may lead to a decline in the strength of the protruding portion as in the second protruding portion 15 of the joint end portion 11 illustrated in FIG. 11(A). Accordingly, in a case where the notch portion 21 is provided also with respect to the joint end portions 11 and 12, it is possible to create an aspect in which the strength of each portion of the joint end portions 11 and 12 does not decrease by, for example, changing the depth of the notch portion 21.

Figure 12:
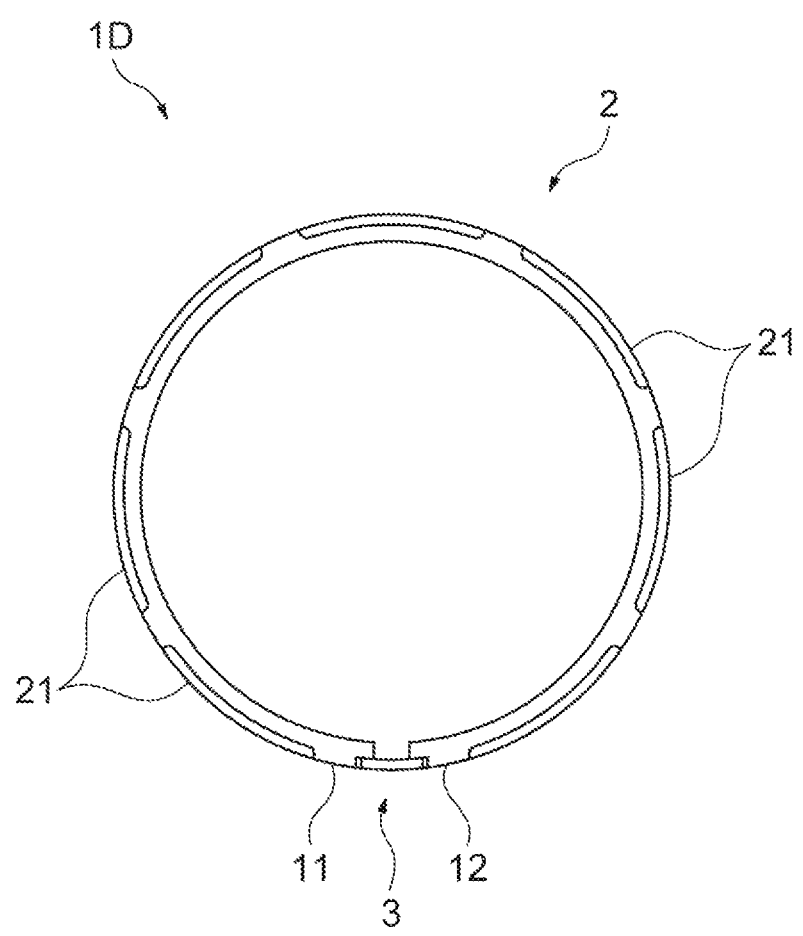
FIG. 12 is a plan view of a piston ring 1D, in which the disposition of a notch portion 21 is changed with respect to the piston ring 1C.

FIG. 12 is a plan view of a piston ring 1D, in which the disposition of the notch portion 21 is changed with respect to the piston ring 1C according to the third modification example. A configuration in which a plurality of the notch portions 21 are spaced apart along the main body portion 2 as in the piston ring 1D in FIG. 12 may be adopted instead of providing the notch portion 21 on the entire circumference of the main body portion 2 as in the piston ring 1C. In the case of the piston ring 1D, a region where the notch portion 21 is not provided is formed between the adjacent notch portions 21. In other words, in the piston ring 1D, the notch portions 21 are intermittently provided. The notch portion 21 provided in the piston ring 1C or the piston ring 1D has the effect of promoting downward oil scraping. When the notch portion 21 is provided, the region (flat surface $2d_2$) where the outer peripheral surface 2*d* and the bore inner peripheral surface abut against each other becomes small, and thus a decline in side surface sealability arises. High side surface sealability may lead to a decline in oil scraping effect (downward scraping effect in particular) as described above and a decline in gas sealability may also arise due to excessively low side surface sealability. Conceivable then is a decline in performance as a piston ring. In this regard, the plurality of notch portions 21 are spaced apart with intermittence as illustrated in FIG. 12. As a result, it is possible to control the side surface sealability within an appropriate range by means of a configuration in which the ratio of the notch portions 21 to the entire circumference of the main body portion 2 can be controlled. With the configuration described above, the strength of the piston ring is also enhanced as compared with a case where the notch portion 21 is provided over the entire circumference.

Modification Example-4

Figure 13:
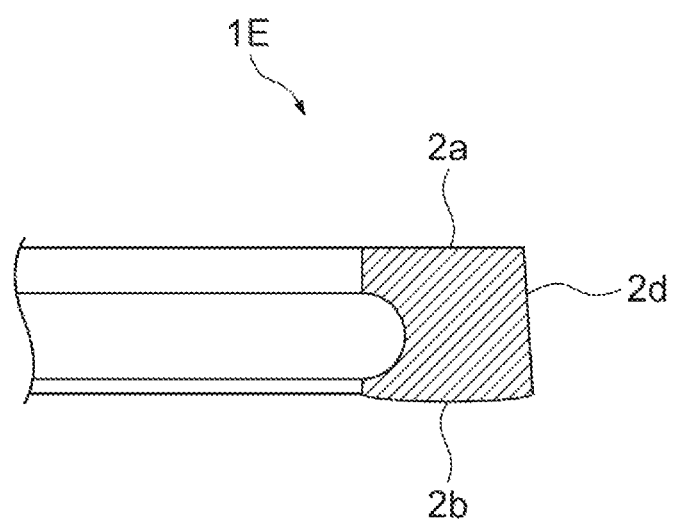
FIG. 13 is a cross-sectional view of the main body portion of a piston ring 1E.

A piston ring 1E according to a fourth modification example is illustrated in FIG. 13. FIG. 13 is a cross-sectional view of the main body portion 2 of the piston ring 1E.

The piston ring 1E according to the fourth modification example is different from the piston ring 1 in that the side surface 2*b* is not flat in shape and has a substantially arcuate barrel face shape in which a part of the surface protrudes.

As described above, a resinous piston ring has high side surface sealability. In some cases, the high side surface sealability leads to a decline in oil scraping effect (downward scraping effect in particular). In the piston rings 1C and 1D according to the third modification example, the area of the side surface 2*b* is reduced and side surface sealability is lowered by the notch portion 21 being provided. In the piston ring 1E according to the fourth modification example, side surface sealability is lowered by means of the barrel face shape by a convex curved surface being provided on the surface of the side surface 2*b*.

The joint portion 3 has a triple step shape in the piston ring 1E having the structure described above. Accordingly, gas sealability improvement and blow-by gas suppression can be achieved. In addition, in the piston ring 1E, the outer peripheral surface 2*d* includes a tapered surface, and thus the oil scraping effect of the outer peripheral surface 2*d* of the piston ring 1 is enhanced. Accordingly, both blow-by gas suppression and a reduction in oil consumption amount can be achieved also in the piston ring 1E. Further, the side surface sealability can be reduced by means of the changed shape of the side surface 2*b*. As a result, a decline in oil scraping effect is prevented in the piston ring 1E.

The surface shape of the side surface 2*b* is not limited to the barrel face shape described above. For example, a configuration in which side surface sealability is controlled may be adopted by a configuration being adopted in which the surface of the side surface 2*b* of the piston ring is provided with unevenness and the area of contact between the side surface 2*b* and the ring groove of the piston is reduced. In a case where the unevenness is provided on the surface of the side surface 2*b*, a decline in performance as a piston ring arises once the side surface sealability between the side surface 2*b* and the ring groove is lost due to the unevenness. Accordingly, possible is an aspect in which the shape of the unevenness is changed within a range in which the side surface sealability is not impaired, that is, a range in which sealability can be ensured when the side surface 2*b* and the ring groove abut against each other.

Modification Example-5

Figure 14:
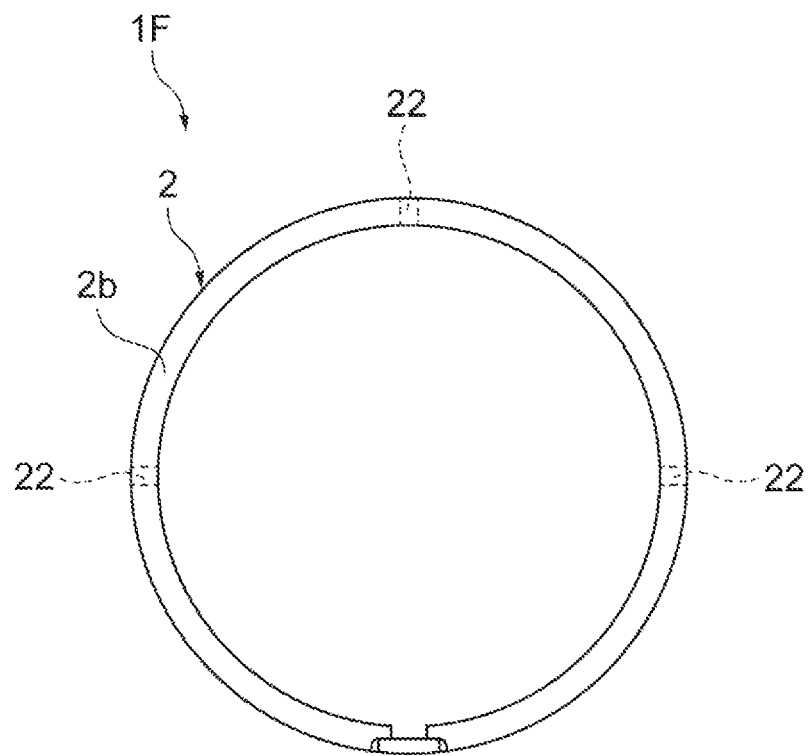
FIG. 14(A) is a bottom view of a piston ring 1F and FIG. 14(B) is a side view of the main body portion of the piston ring 1F.
Figure 14:
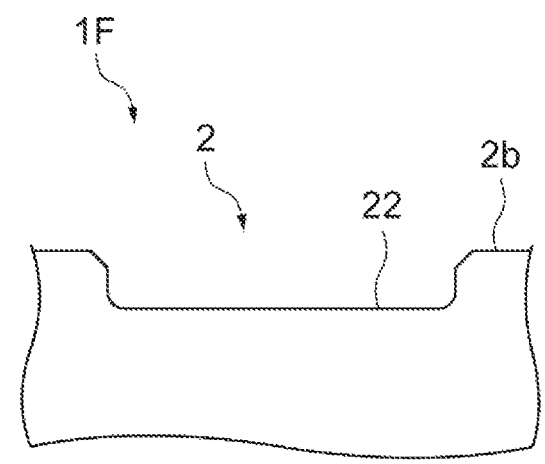

A piston ring 1F according to a fifth modification example is illustrated in FIG. 14. FIG. 14(A) is a bottom view of the piston ring 1F and FIG. 14(B) is a side view of the main body portion of the piston ring 1F (viewed from the outer peripheral surface 2*d* side).

The piston ring 1F according to the fifth modification example is different from the piston ring 1 in that the side surface 2b is provided with one or more recessed portions. Specifically, groove portions 22 are formed in the side surface 2b of the piston ring 1F and the groove portions 22 are recessed portions performing penetration between the inner peripheral surface 2c side and the outer peripheral surface 2d side. In the case of the piston ring 1F, the groove portions 22 are provided in a dispersed manner at three places on the side surface 2b. In other words, side surface sealability is controlled by the recessed portions (groove portion 22) being provided such that unevenness is formed on the surface of the side surface 2b of the piston ring.

As described above, a resinous piston ring has high side surface sealability. In some cases, the high side surface sealability leads to a decline in oil scraping effect (downward scraping effect in particular). In this regard, in the piston ring 1F according to the fifth modification example, the area of the side surface 2b is reduced and side surface sealability is lowered by the groove portions 22, which perform penetration between the inner peripheral surface 2c side and the outer peripheral surface 2d side, being provided. In addition, it is possible to perform side surface sealability control by changing, for example, the number of the groove portions 22.

Figure 15:
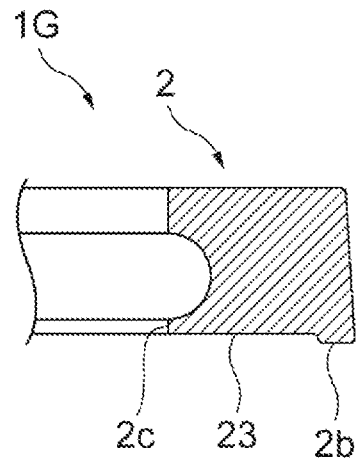
FIG. 15(A) is a cross-sectional view of the main body portion of a piston ring 1G and FIG. 15(B) is a bottom view of the piston ring 1G.
Figure 15:
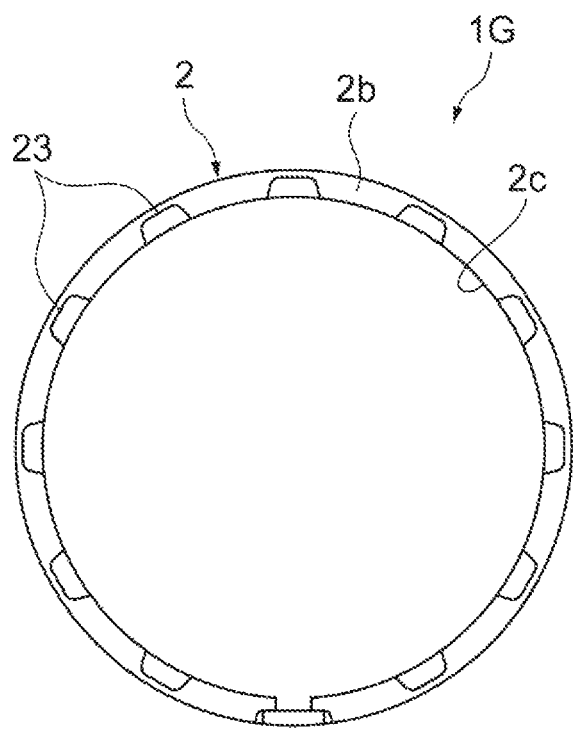

Illustrated in FIG. 15 is a piston ring 1G, in which the shape and disposition of the recessed portion on the side surface 2b side are changed with respect to the piston ring 1F. FIG. 15(A) is a cross-sectional view of the main body portion of the piston ring 1G and FIG. 15(B) is a bottom view of the piston ring 1G.

In the case of the piston ring 1G, the side surface 2b is provided with one or more recessed portions 23. The recessed portion 23 performs no penetration between the inner peripheral surface 2c side and the outer peripheral surface 2d side and is provided so as to open only on the inner peripheral surface 2c side. In a case where the side surface 2b of the piston ring is provided with the recessed portion as described above, the shape thereof can be appropriately changed. Even in a case where the notch portion 21 is provided on the side surface 2b side as in the piston ring 1C, it is possible to perform side surface sealability control by means of the recessed portion by forming the recessed portion with respect to the side surface 2b at a position different from the notch portion 21.

Modification Example-6

Figure 16:
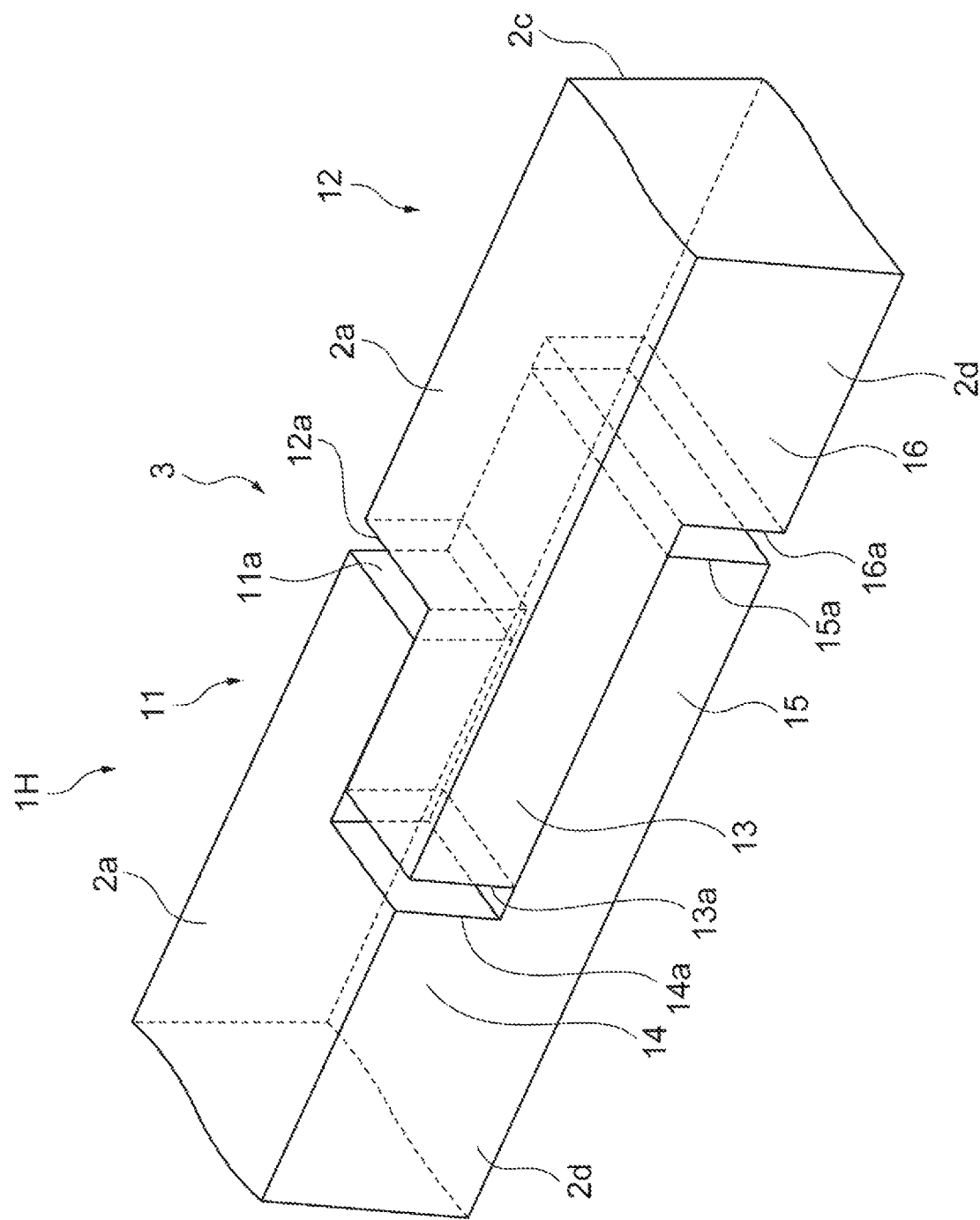
FIG. 16 is a perspective view describing the structure of the joint portion of a piston ring 1H.

FIG. 16 illustrates a piston ring 1H according to a sixth modification example. FIG. 16 is a perspective view describing the structure of the joint portion 3 of the piston ring 1H. In the piston ring 1H, the structure of the joint portion 3 is changed as compared with the piston ring 1.

In the piston ring 1 described above, the joint portion 3 has a so-called triple step shape. In the piston ring 1H according to the sixth modification example, the joint portion 3 has a step shape when viewed from two directions. In the case of the piston ring 1H, the joint portion 3 has a step shape when viewed from the upper side surface 2a side and when viewed from the outer peripheral surface 2d side.

More specifically, the piston ring 1H is different from the piston ring 1 in that the facing surfaces 11a and 12a of the joint end portion 11 and the joint end portion 12, which are in substantially half of the main body portion 2 on the inner peripheral surface 2c side, are provided in substantially half on the side surface 2a side (at the part that is substantially the upper half in FIG. 16). In substantially half of the main body portion 2 of the piston ring 1H on the side surface 2b side (at the part that is substantially the lower half in FIG. 16), the joint end portion 11 is provided with the second protruding portion 15 protruding to the joint end portion 12 side beyond the facing surface 11a and the joint end portion 12 is provided with the second receiving portion 16 receiving the second protruding portion 15. The distal end surface 15a of the second protruding portion 15 and the receiving surface 16a of the second receiving portion 16 face each other. The piston ring 1H is different from the piston ring 1 in that the second protruding portion 15 and the second receiving portion 16 are formed from the inner peripheral surface 2c to the outer peripheral surface 2d on the side surface 2b side.

The piston ring 1H is identical to the piston ring 1 in that the first protruding portion 13 and the first receiving portion 14 are provided in substantially half of the main body portion 2 on the outer peripheral surface 2d side and substantially half of the main body portion 2 on the side surface 2a side (at the part that is substantially the upper half in FIG. 16) and the distal end surface 13a of the first protruding portion 13 and the receiving surface 14a of the first receiving portion 14 face each other.

As a result, the positions where the facing surfaces 11a and 12a are provided and the positions where the distal end surface 13a of the first protruding portion 13 and the receiving surface 14a of the first receiving portion 14 are provided are different from each other along the longitudinal direction of the main body portion 2 when viewed from the side surface 2a side and a step shape results from the difference. The positions where the distal end surface 13a of the first protruding portion 13 and the receiving surface 14a of the first receiving portion 14 are provided and the positions where the distal end surface 15a of the second protruding portion 15 and the receiving surface 16a of the second receiving portion 16 are provided are different from each other along the longitudinal direction of the main body portion 2 when viewed from the outer peripheral surface 2d side and a step shape results from the difference. In the case of the piston ring 1H, only the second protruding portion 15 and the second receiving portion 16 are visible when the piston ring 1H is viewed from the side surface 2b side, which results in no step shape. Accordingly, the piston ring 1H has a step shape when viewed from the side surface 2a side and the outer peripheral surface 2d side. In the case of the piston ring 1H, the positions where the facing surfaces 11a and 12a are provided and the positions where the distal end surface 15a of the second protruding portion 15 and the receiving surface 16a of the second receiving portion 16 are provided are different from each other along the longitudinal direction of the main body portion 2 when viewed from the inner peripheral surface 2c side and a step shape results from the difference. Accordingly, it can be said that the structure of the joint portion 3 of the piston ring 1H is also a so-called triple step shape that has a step shape when viewed from three directions (the side surface 2b, the inner peripheral surface 2c, and the outer peripheral surface 2d).

As described above, the structure of the joint portion 3 of the piston ring 1H has a step shape when viewed from one side surface (here, 2a) and the outer peripheral surface 2d and has no step shape when viewed from the other side surface (here, 2b). The piston ring 1H has no step shape when viewed from the pair of side surfaces 2a and 2b and the outer peripheral surface 2d. Even when the joint portion 3 of the piston ring 1H has the structure described above, the flow area formed between the pair of side surfaces is reduced and a reduction in gas amount is achieved after attachment to the piston. Accordingly, gas sealability improvement and blow-by gas suppression can be achieved. Whether the structure is to have the step shape when viewed from the side surface 2a or the structure is to have the step shape when viewed from the side surface 2b can be appropriately changed. In other words, the structure may have the step shape when viewed from the side surface 2b.

An embodiment of the present invention has been described above. However, the present invention is not limited to the embodiment and can be changed in various ways.

EXAMPLES

Example 1

As Example 1, a piston ring according to Example 1 in which the joint portion has a triple step shape and the outer peripheral surface has a tapered shape in whole (see FIG. 4) was created by injection molding being performed on polyether ether ketone.

Example 2

A piston ring according to Example 2 was created by the same method as the piston ring of Example 1 except that a part (the crank chamber side) of the outer peripheral surface is a flat surface (see FIG. 6).

Example 3

A piston ring according to Example 3 was created by the same method as the piston ring of Example 1 except that a tapered surface (the combustion chamber side) and a reverse tapered surface (the crank chamber side) are formed on the outer peripheral surface, a flat surface is formed between the tapered surface and the reverse tapered surface, and the outer peripheral surface side end portion of the step-shaped step portion is provided on the flat surface (see FIGS. 7 and 8).

Example 4

A piston ring according to Example 4 was created by the same method as the piston ring of Example 1 except that a tapered surface (the combustion chamber side) and a reverse tapered surface (the crank chamber side) are formed on the outer peripheral surface and the outer peripheral surface side end portion of the step-shaped step portion is provided at the connection part between the tapered surface and the reverse tapered surface. The piston ring according to Example 4 corresponds to the piston ring of Example 3 in which the length of the flat surface is zero.

Example 5

A piston ring according to Example 5 was created by the same method as the piston ring of Example 1 except that a notch portion is provided in the main body portion on the outer peripheral surface side and the side surface 2b side other than the joint portion (see FIGS. 9 to 11).

Comparative Example 1

A piston ring made of martensitic stainless steel was created as Comparative Example 1. In the piston ring of Comparative Example 1, the joint portion is a straight joint (with a gap of 0.25 in), the outer peripheral surface has a barrel face shape, and a CrN-based hard film is applied to the outer peripheral surface.

Comparative Example 2

A piston ring according to Comparative Example 2 was created by the same method as Example 1 except that the outer peripheral surface is straight in shape. The piston ring of Comparative Example 2 is made of resin.

(Performance Evaluation)

Blow-by and oil consumption amounts were measured by means of a water-cooled and four-cycle naturally aspirated gasoline engine. The piston rings to be evaluated (Examples 1 to 5 and Comparative Examples 1 and 2) were mounted in the ring groove for a top ring of the piston of the engine. At this time, a coil spring was mounted such that a tension of approximately 6 N was applied from the inner peripheral surface side. An oil ring already mounted in the piston groove of the engine was used as the second ring.

The operating conditions were 4,000 rpm and full load (wide open throttle: WOT) conditions. The operation continued for 10 hours. Each of the blow-by gas and oil consumption amounts was measured after the operation under the operating conditions described above.

Shown in Table 1 with regard to the piston rings of Examples 1 to 5 and Comparative Examples 1 and 2 are the joint shape, the inclination angle θ1 (°) of the tapered part (tapered surface), the length (ratio to the width dimension) in a case where the outer peripheral surface has a flat surface, the inclination angle θ2 (°) of the reverse tapered surface, the blow-by gas amount as a performance evaluation result, and the oil consumption amount as a performance evaluation result. The measurement results are ratios at a time when each of the blow-by gas and oil consumption amounts at a time when the piston ring of Comparative Example 1 is used is 100.

TABLE 1

|  | Joint shape | Taper angle θ1 (°) | Flat surface length (ratio to width dimension) | Reverse taper angle θ2 (°) | Blow-by gas amount | Oil consumption amount |
| --- | --- | --- | --- | --- | --- | --- |
| Example 1 | Triple | 5 | 0% | — | 40 | 105 |
| Example 2 | Triple | 8 | 10% | 90 | 30 | 80 |
| Example 3 | Triple | 10 | 5% | 10 | 35 | 85 |
| Example 4 | Triple | 20 | 0% | 60 | 35 | 90 |
| Example 5 | Triple | 3 | 8% | 30 | 30 | 85 |
| Comparative Example 1 | Straight | — | 0% | — | 100 | 100 |
| Comparative Example 2 | Triple | 0 | 100% | — | 30 | 150 |

INDUSTRIAL APPLICABILITY

According to the present invention, a piston ring capable of achieving both blow-by gas suppression and oil consumption amount reduction is provided.

REFERENCE SIGNS LIST

1: piston ring, 2: main body portion, 2a, 2b: side surface, 2c: inner peripheral surface, 2d: outer peripheral surface, 3: joint portion, 11, 12: joint end portion.

The invention claimed is:

1. A piston ring which is resinous comprising:
    an annular main body portion having an inner peripheral surface and an outer peripheral surface facing away from each other, and a pair of side surfaces interconnecting the inner peripheral surface and the outer peripheral surface; and
    a joint portion formed in the main body portion,
    wherein the joint portion has a step shape when viewed from at least one of the pair of side surfaces and the outer peripheral surface,
    wherein the outer peripheral surface has a tapered surface having an outer diameter increasing from a side of one side surface of the pair of side surfaces toward a side of the other side surface,
    wherein the tapered surface is provided at a part of the outer peripheral surface including the joint portion on the side of the one side surface,
    wherein an end portion of a step-shaped step portion on a side of the outer peripheral surface is provided at a position different from the tapered surface, the step portion being formed continuously from the outer peripheral surface,
    wherein the joint portion comprises a first protruding portion, a first receiving portion, a second protruding portion and a second receiving portion,
    wherein a distal end surface of the first protruding portion and a receiving surface of the first receiving portion face each other in a circumferential direction of the piston ring, and a distal end surface of the second protruding portion and a receiving surface of the second receiving portion face each other in the circumferential direction, so as that the step portion is formed by the first protruding portion, the first receiving portion, the second protruding portion and the second receiving portion,
    wherein a boundary between the first protruding portion and the second protruding portion forms a split portion,
    wherein the split portion is closer to the other side surface than the one side surface, and
    wherein the tapered surface is formed at a part of the first protruding portion and the first receiving portion, and no tapered surface is formed at a part of the second protruding portion and the second receiving portion.

2. The piston ring according to claim 1, wherein the part at which no tapered surface is formed abuts against a bore inner peripheral surface.

* * * * *